Feb. 3, 1970    S. T. MARTIN    3,492,946
DUAL VOLUME FLUID SAMPLE PUMP
Filed May 23, 1968
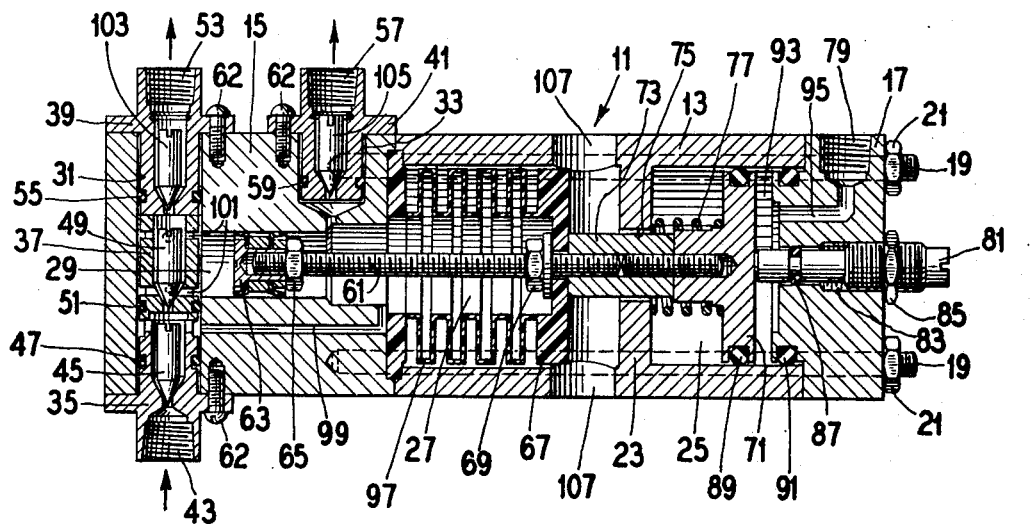
INVENTOR
STERLING T. MARTIN
BY *Maurice W. Ryan*
ATTORNEY United States Patent Office 3,492,946
Patented Feb. 3, 1970

3,492,946
DUAL VOLUME FLUID SAMPLE PUMP
Sterling T. Martin, Charleston, W. Va., assignor to Union Carbide Corporation, a corporation of New York
Filed May 23, 1968, Ser. No. 731,595
Int. Cl. F04b 13/00, 5/00; G01n 1/14
U.S. Cl. 103—2                                                 7 Claims

ABSTRACT OF THE DISCLOSURE

A fluid sampling reciprocating pump apparatus having two chambers into which a fluid stream to be sampled and analyzed is drawn on each suction stroke. One chamber is relatively larger than the other. On each discharge stroke the fluid sample from the smaller precisely metered chamber is discharged to an analyzer while the fluid from the large chamber is simultaneously discharged to waste or returned to the sampled stream, thus assuring that the metered and analyzed sample is representative of a relatively large and fresh volume extracted from the stream of interest.

---

This invention relates to a reciprocally acting fluid sampling pump and more particularly to a dual chamber pump which takes a fresh fluid sample volume at each suction stroke and splits it into two routes, one passing a relatively large volume and the other a precisely metered relatively small volume, through the apparatus. On each discharge stroke, pistons in the large and small volume chambers co-act on a common shaft simultaneously to discharge the sample respectively to line return and to preselected analyzer apparatus. Alternatively, the large volume portion of the sample may be discarded instead of returned to the monitored stream or line.

Fluid stream monitoring in industry and in public works has contributed greatly in recent years to safety, increased efficiency of processes and high levels of product quality control. Effective stream monitoring for applications such as sewage treatment, stream pollution control and process control work is predicated to a great extent on sampling apparatus capable of continually extracting samples to be analyzed and metering them to analyzer equipment with consistent precision and reproducibility. It is also important that the samples periodically extracted and delivered for analysis be truly representative of the stream conditions at the time of sampling that is to say that the sample should not only be fresh but also taken in sufficient quantity to avoid missing trace components or representative concentrations thereof which might be missed or misrepresented in a small extracted volume. Prior to the time of the present invention, available sampling and metering pump apparatus has been found to lack the aforedescribed desirable characteristics and features in one or more respects.

Accordingly, it is an object of this invention to provide a sampling and metering pump apparatus which can regularly extract fresh sample volumes from a stream being monitored and deliver a precisely metered portion thereof to analysis and at the same time return the unanalyzed portion of the extracted sample volume to the monitored stream or, alternatively, to discard it.

It is a further object of this invention to provide such a pump apparatus capable of consistent reproducibility and accuracy.

A still further object of the present invention is to provide a sampling and metering apparatus which is simple in design and construction and having high reliability and freedom from maintenance.

Further objects and advantages of the invention will become readily apparent in the light of the ensuing more detailed description and the appended drawing which is a sectionalized view of an apparatus embodiment according to the said invention.

With reference to the drawing, there is shown a pump indicated generally as 11 which may comprise a main body element 13, a valve housing 15 and a closure cap 17, all of which may be suitably machined castings. These components may be held assembled by thru bolts 19 anchored in drilled and tapped holes in valve housing 15 and secured by nuts 21 bearing on the outer end surface of closure cap 17. As shown in the drawings the main body element 13 has a hollow interior divided into two spaces separated by a barrier wall 23. The space to the right of barrier wall 23 defines an actuating piston chamber and is designated 25 and the space to the left of the barrier wall constitutes part of a fluid chamber 27. One or more vent ports 107 to atmosphere, the purpose of which will be hereinafter described, are also provided in element 13. Valve housing 15 is provided with a longitudinal interior space extending part way therethrough, one part of which constitutes part of fluid chamber 27 and a second part of which constitutes another fluid chamber 29. A valve assembly bore 31 passes through valve housing 15 transversely to and communicating with the aforedescribed longitudinal interior space and another valve assembly bore 33 is provided through a wall portion of valve housing 15 arranged transversely to the longitudinal interior space and also communicating therewith. Two intake valves 35 and 37 and a discharge valve 39 are arranged and disposed in the bore 31. Intake valve 35 is provided with an inlet port 43, a movable valve element 45 and an O-ring seal 47. Intake valve 37 comprises a movable valve element 49 and an O-ring seal 51. Discharge valve 39 is provided with a discharge port 53 and an O-ring seal 55. A second discharge valve 41 is arranged in the bore 33 and is provided with a discharge port 57 and an O-ring seal 59. The valves are held in place in valve housing 15 by machine screws 62 or the like. The function and description of other valve passages in the valve assemblies will be described hereinafter in the explanation of the operation of the apparatus.

A piston assembly extends longitudinally interior of the assembled pump 11 and comprises a shaft 61, a metering piston 63 secured to the shaft by a holding nut 65, a by-pass piston 67 secured to the shaft by a holding nut 69 and an actuating piston 71 threadedly engaged on the actuating end of the shaft 61. A spacer collet 73 is arranged on the shaft between the by-pass piston 67 and the actuating piston 71 and serves to act as a sliding bearing in a hole 75 through barrier wall 23. A coil spring 77 is arranged under compression between the underside of actuating piston 71 and barrier wall 23.

Closure cap 17 is provided with an actuating fluid port 79 and a stroke adjustment screw 81. Stroke adjustment screw 81 is arranged in a centrally located, partially threaded hole 83 in closure cap 17 and is provided with a locking nut 85 and an O-ring seal 87. O-ring seals 89 and 91 are also provided respectively on the actuating piston 71 and between the inner wall of main body element 13 and an interior shoulder portion of closure cap 17. The space between the working face of actuating piston 71 and the interior face of closure cap 17 defines an actuating fluid chamber 93. An actuating fluid passage 95 connects the actuating fluid chamber 93 with actuating fluid port 79.

A collapsible bellows 97 is arranged in fluid chamber 27 and has one end connected to by-pass piston 67 and the other end secured in a recess at the joint between main body element 13 and valve housing 15.

The inlet port 43, discharge ports 53 and 57 and actuating fluid port 79 are all adapted for exterior conduit connections.

To operate the pump, the stroke adjustment screw 81 is turned to bear on actuating piston 71 and compress spring 77. The exact adjustment position is selected according to the desired volume of metered sample to be expelled on each discharge stroke from the fluid chamber 29. Each actuating fluid pressure pulse in actuating fluid chamber 93 drives the entire piston assembly in a discharge stroke. When the actuating fluid pressure pulse subsides the coil spring 77 returns the piston assembly in a suction stroke to rest against the interior end of stroke adjustment screw 81.

During each suction stroke, a volume of fluid to be sampled is drawn in through the inlet port 43. The movable valve elements 45 and 49 in the intake valves 35, 37 are raised from their respective seats permitting the sample fluid to flow into these valves. A large portion of the sample fluid is conducted into fluid chamber 27 through by-pass fluid passage 99 which communicates with inlet valve 35, while a relatively smaller portion of the sampled fluid volume passes into the fluid chamber 29 through the inlet valve 37 which is provided with ports 101 communicating with fluid chamber 29. The movable elements 103, 105 in the discharge valves 39, 41 are in the down position against their respective seats and thus closed during each suction stroke. On the discharge stroke occasioned by the next actuating fluid pressure pulse, the movable valve elements 45 and 49 in the intake valves 35, 37 are driven by fluid pressure against their respective seats and are thus closed. Simultaneously, the movable elements 103, 105 in the discharge valves 39, 41 are raised from their respective seats by fluid pressure and open to permit discharge of the fluid from fluid chamber 29 through the ports 101, discharge valve 39 and discharge port 53 and the fluid from fluid chamber 27 through discharge valve 41 and discharge port 57.

In a representative application of the present invention, the fluid chamber 29 sample volume, which is relatively small and precisely metered, is passed to an analyzer and the sample volume from fluid chamber 27 which is relatively large is passed through discharge port 57 and conducted back to the line from which the samples are being extracted. Air lock binding of the large by-pass piston 67 is obviated by venting the space between by-pass piston 67 and barrier wall 23 to atmosphere by means of vents 107 through the wall of main body element 13.

The versatility of apparatus according to the present invention may be enhanced by adjusting or modifying the metering discharge valve 53 to open later than the bypass discharge valve 57 during discharge stroke. This can be accomplished by increasing downstream pressure in the metering discharge line with an orifice or the like flow restrictor device or by spring-loading or otherwise modifying the metering discharge valve 53 so that the desired later opening thereof is effected. Such modification, it has been found in experiments, also stabilizes the metered flow rate of the pump, particularly at back pressures of 15 p.s.i.g. and above, and thus improves reproducibility of sample metering.

In the light of the foregoing description, alternative embodiments of apparatus within the scope of the present invention will undoubtedly occur to persons familiar with the art. Actuation of the piston assembly, for example, may be accomplished by any suitable means such as manual, electric solenoid or mechanical camming or the like. For certain applications it may be advantageous or necessary to have the sample fluid chambers of equal volume rather than one larger than the other. The foregoing description therefore is to be taken as illustrative only and not in any limiting sense, it being intended to define the scope of the present invention by the appended claims.

What is claimed is:

1. A dual volume pump comprising, in combination, a pump body having a first fluid chamber and second fluid chamber; first piston means arranged to move reciprocally in the first fluid chamber; second piston means arranged to move reciprocally in said second fluid chamber; shaft means fixedly connecting the first piston means and the second piston means; a first intake valve having an inlet port connectable to a fluid intake conduit and a first discharge port connecting to the first fluid chamber; a second intake valve having an inlet port connected to a second discharge port of the first intake valve and a first discharge port connecting to the second fluid chamber; a first discharge valve having an inlet port connecting to the first fluid chamber and a discharge port connectable to a first fluid discharge conduit; a second discharge valve having an inlet port connected to a second discharge port of the second intake valve and a discharge port connectable to a second fluid discharge conduit; said intake valves arranged to open during movement of said pistons in a first direction and to close during movement of said pistons in a second direction and said discharge valves arranged to open during movement of said pistons in said second direction and to close during movement of said pistons in said first direction.

2. Apparatus according to claim 1 in which the volume of the first fluid chamber is larger than the volume of the second fluid chamber.

3. Apparatus according to claim 1 in which the volume of the first fluid chamber is smaller than the volume of the second fluid chamber.

4. Apparatus according to claim 1 in which the first fluid chamber is at least partially defined by a collapsible bellows having an end sealably attached to the first piston means.

5. Apparatus according to claim 1 in which said shaft means extends beyond the first and second fluid chambers and is connected to reciprocally movable actuating means.

6. Apparatus according to claim 5 in which said reciprocally movable actuating means comprises a fluid actuated piston arranged to move reciprocally in a chamber.

7. Apparatus according to claim 1 in which said second discharge valve is adapted to open later than the opening of said first discharge valve during the movement of said pistons in said second direction.

References Cited

UNITED STATES PATENTS

| 2,841,085 | 7/1958 | Evans | 103—168 X |
|---|---|---|---|
| 2,995,931 | 8/1961 | Perry et al. | 73—422 X |
| 3,016,840 | 1/1962 | Frick | 103—150 X |
| 3,039,399 | 6/1962 | Everett | 103—150 |
| 3,128,782 | 4/1964 | Limpert et al. | 103—167 X |
| 3,215,080 | 11/1965 | Bernard | 103—4 |
| 3,308,669 | 3/1967 | Grise et al. | 73—422 |
| 3,321,977 | 5/1967 | Topham | 103—2 X |

DONLEY J. STOCKING, Primary Examiner

WARREN J. KRAUSS, Assistant Examiner

U.S. Cl. X.R.

73—422; 103—4, 168